United States Patent [19]

Lentz et al.

[11] Patent Number: 5,029,494
[45] Date of Patent: Jul. 9, 1991

[54] CONTROL METHOD OF CLUTCH-TO-CLUTCH POWERED DOWNSHIFT IN AN AUTOMATIC TRANSMISSION

[75] Inventors: Carl A. Lentz, Mooresville; Joseph H. Hunter, Carmel, both of Ind.

[73] Assignee: General Motors Corporation, Detroit, Mich.

[21] Appl. No.: 456,885

[22] Filed: Dec. 26, 1989

[51] Int. Cl.$^5$ .................. F16H 61/06; F16H 59/46
[52] U.S. Cl. ........................................ 74/866; 74/877
[58] Field of Search .................. 74/866, 867, 868, 877

[56] References Cited

U.S. PATENT DOCUMENTS

| | | | |
|---|---|---|---|
| 4,653,351 | 3/1987 | Downs et al. | 74/866 |
| 4,796,490 | 1/1989 | Butts et al. | 74/866 |
| 4,858,499 | 8/1989 | Ito et al. | 74/866 |
| 4,887,491 | 12/1989 | Holbrook et al. | 74/866 |
| 4,938,102 | 7/1990 | Leising et al. | 74/866 |
| 4,942,787 | 7/1990 | Aoki et al. | 74/867 |

Primary Examiner—Allan D. Herrmann
Assistant Examiner—Khoi Q. Ta
Attorney, Agent, or Firm—Mark A. Navarre

[57] ABSTRACT

In an automatic transmission, clutch-to-clutch powered downshifting is controlled by filling the on-coming clutch at a low pressure while ramping down the off-going clutch pressure until turbine speed is pulled up due to off-going clutch slippage, and then increasing the off-going pressure stepwise to compensate the change from static to dynamic coefficients of friction. Then the on-coming pressure is gradually ramped up and a closed-loop profile control period starts wherein the slip of the on-coming clutch is measured and controlled to a slip profile by controlling the off-going clutch pressure. When synchronization of the on-coming clutch is first detected, a closed-loop sync control period starts wherein the off-going pressure is controlled to minimize the slip and the on-coming pressure is ramped up at a steeper rate to begin clutch engagement during the sync control period.

8 Claims, 11 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |

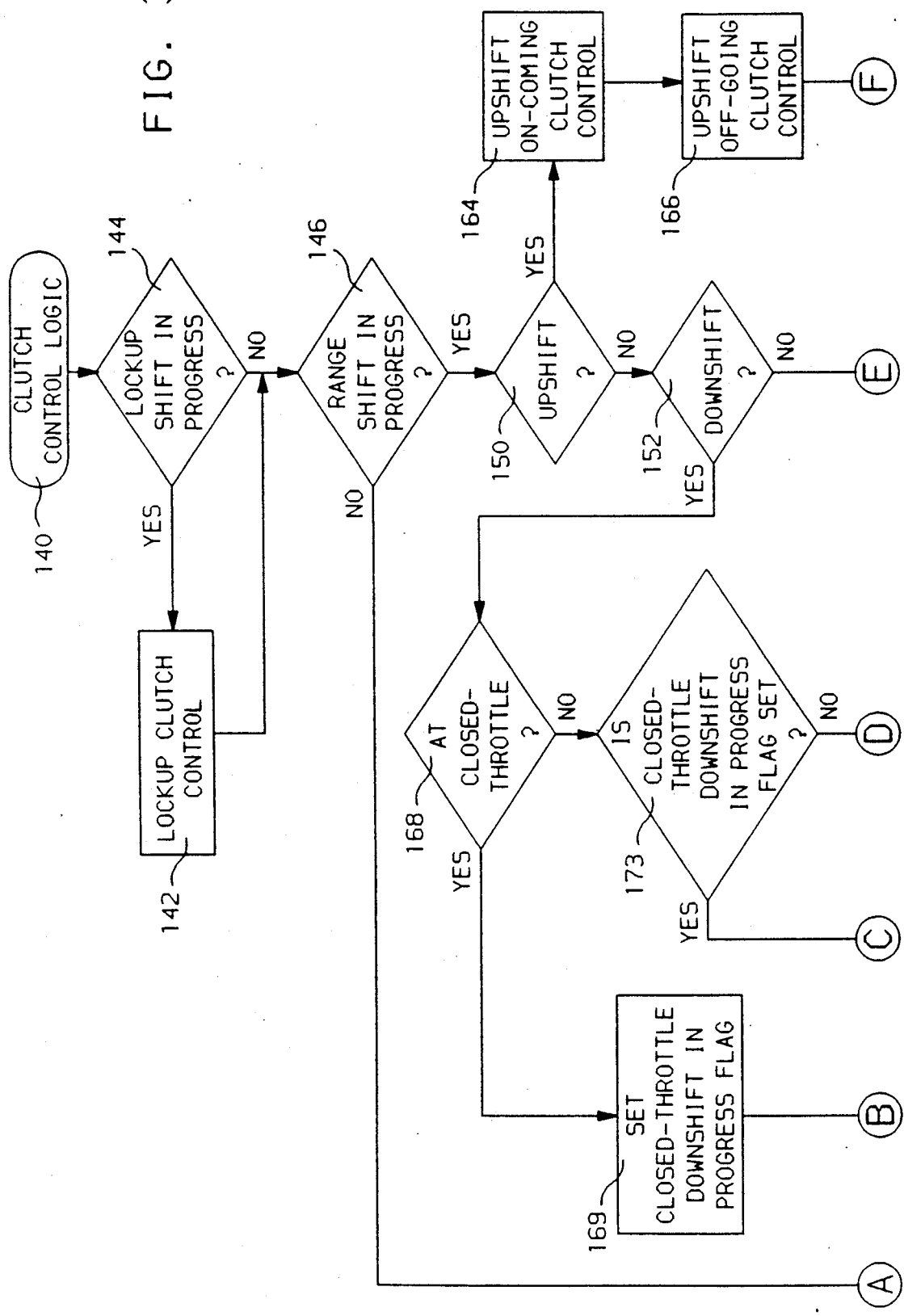

CONTROL METHOD OF CLUTCH-TO-CLUTCH POWERED DOWNSHIFT IN AN AUTOMATIC TRANSMISSION

FIELD OF THE INVENTION

This invention relates to a control method for an automatic transmission, and more particularly, to such a method for controlling a clutch-to-clutch powered downshift.

BACKGROUND OF THE INVENTION

Generally, a motor vehicle automatic transmission includes a number of gear elements coupling its input and output shafts, and a related number of torque establishing devices, such as clutches and brakes, which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio.

The speed ratio is defined as the transmission input speed or turbine speed divided by the output speed. Thus, a low gear range has a high speed ratio, and a higher gear range has a lower speed ratio. To perform a downshift, a shift is made from a low speed ratio to a high speed ratio. In the type of transmission involved in this invention, the downshift is accomplished by disengaging a clutch associated with the lower speed ratio and engaging a clutch associated with the higher speed ratio to thereby reconfigure the gear set to operate at the higher speed ratio. Shifts performed in the above manner are termed clutch-to-clutch shifts and require precise timing in order to achieve high quality shifting.

SUMMARY OF THE INVENTION

It is therefore an object of the invention to provide a method of controlling a powered downshift in an automatic transmission by disengaging one clutch and engaging another clutch in a controlled manner and using transmission speed feedback to manage the control. In particular, a motor vehicle automatic transmission with an electronic control system achieves high quality powered downshifts by monitoring input and output speed to coordinate on-coming clutch application and off-going clutch release. A closed-loop control causes the on-coming clutch to follow a slip speed profile by controlling the off-going clutch pressure command.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG. 1a.

FIGS 2 and 3a-3b are flow diagrams representative of computer program instructions executed by the computer based controller of FIG. 1a in carrying out the shift control of the transmission.

DESCRIPTION OF THE INVENTION

Figure 1A:
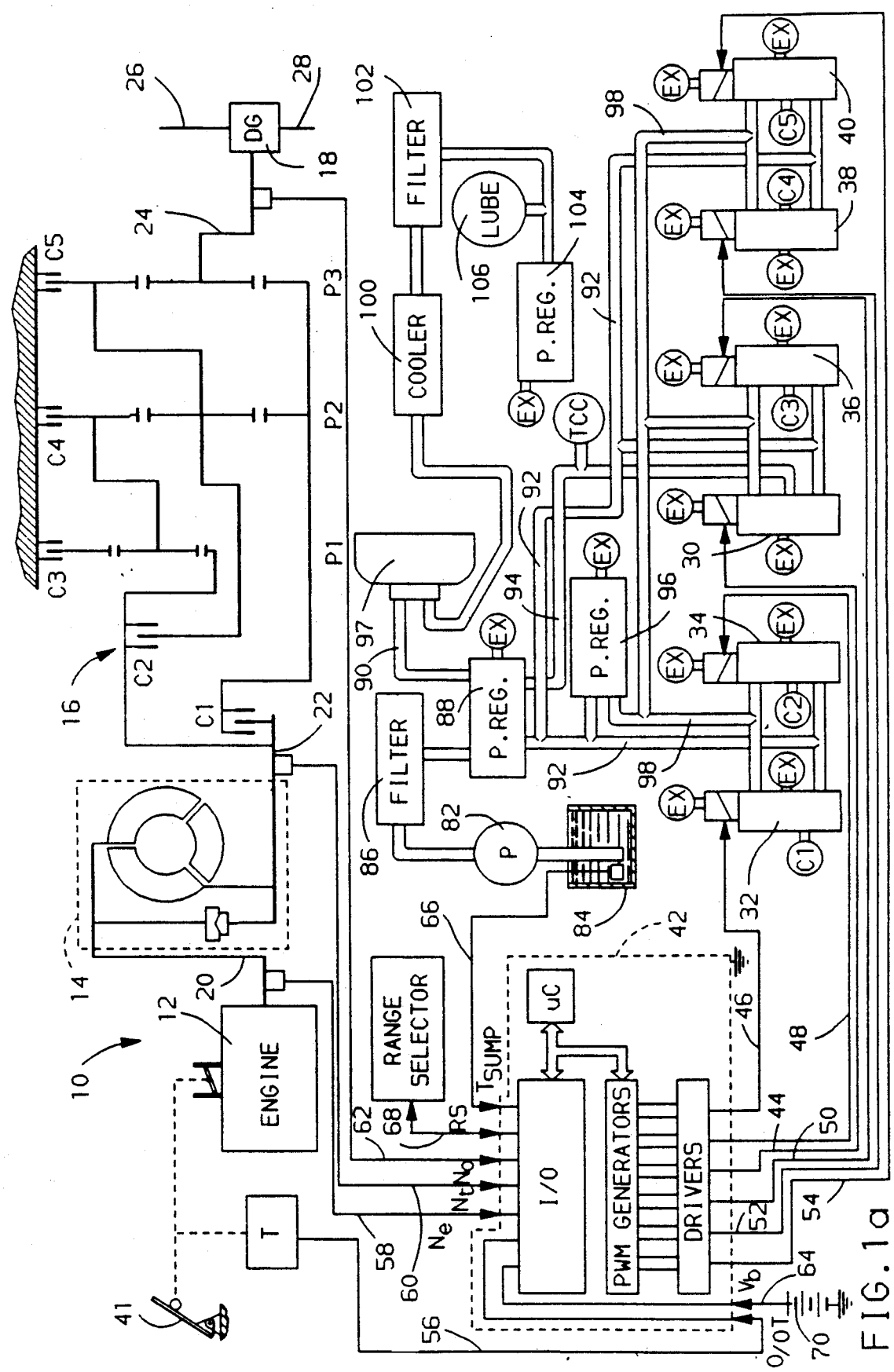
FIG. 1a is a system diagram of a fluid operated motor vehicle transmission, including several solenoid operated fluid pressure control valves and a computer-based control unit for carrying out the control technique invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement, require a fill time before torque is transmitted between a driving and a driven friction element.

The speed and torque relationships between the engine 12 and the drive wheels of the vehicle are controlled by a fluid operated torque converter clutch, designated TCC, and five fluid operated transmission clutches, designated C1-C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio. The illustrated transmission gear set provides one reverse ratio and six forward ratios, and is described in detail in the U.S. Pat. No. 4,070,927 to Polak, issued Jan. 31, 1978, and assigned to the assignee of the present invention. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1-C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
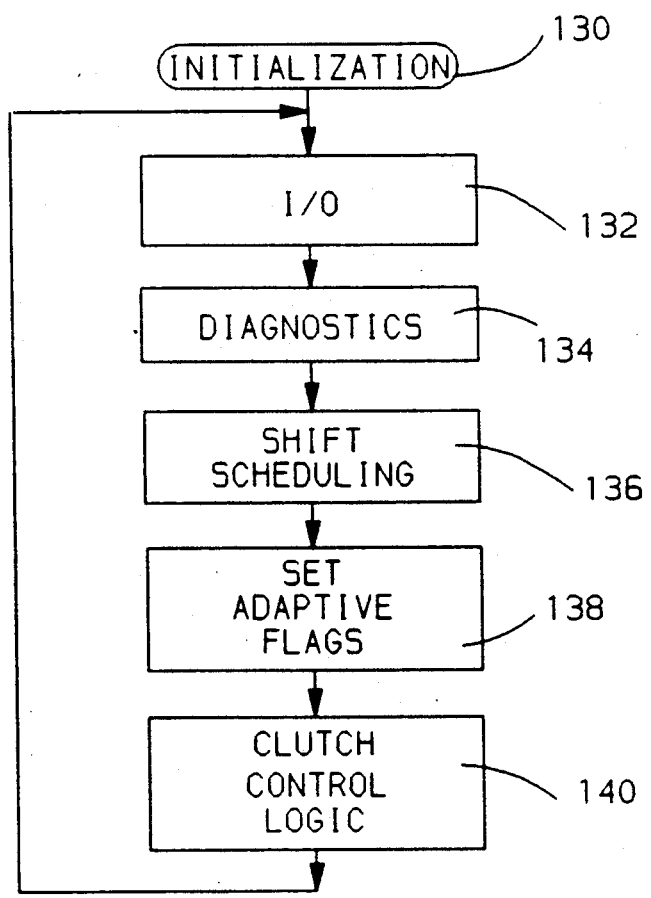

FIGS. 2, 3 and 6-10 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132-140 are sequentially and repeatedly executed, as indicated by the flow diagram lines. Block 132 reads the various input signal values and outputs the required control signals to the PWM generators and drivers for solenoid controlled valves 30-40. Blocks 134-138 contain diagnostic, shift scheduling, and adaptive flag logic.

The clutch control logic block 140 analyzes the various system input signals, described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a-3b.

Figure 3B:
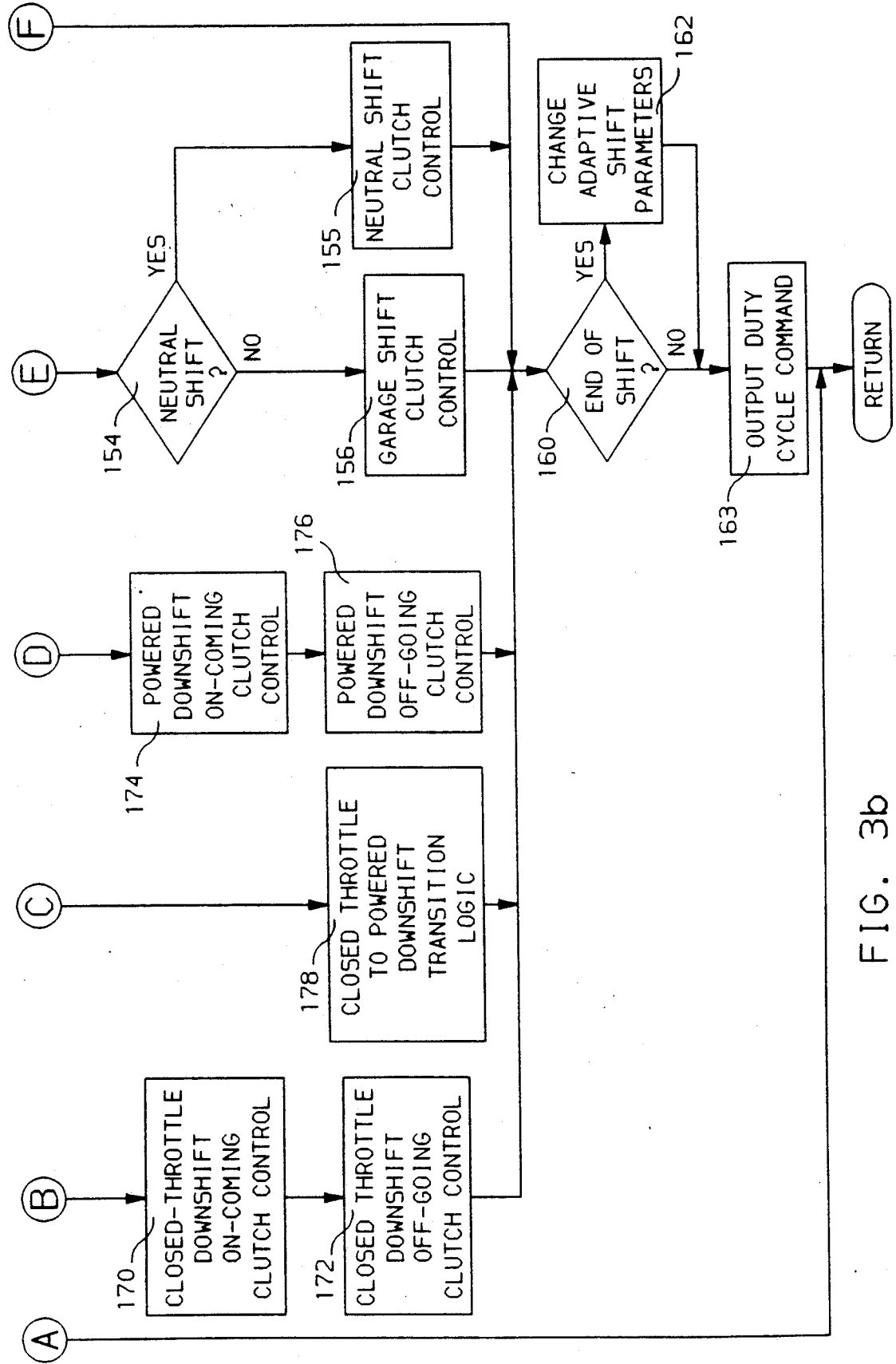

The flow diagram of FIGS. 3a-3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift is a shift from neutral to either drive or reverse, or a shift from drive to reverse or from reverse to drive. The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary; in such case, the appropriate transition logic is invoked <178>. If the shift is a neutral shift <154>, the neutral shift clutch control executes shifts from drive to neutral or from reverse to neutral <155>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1-2, 2-1, 4-3, 5-4, etc. Converter and lockup modes may also require separate sets of calibration values.

Figure 4:
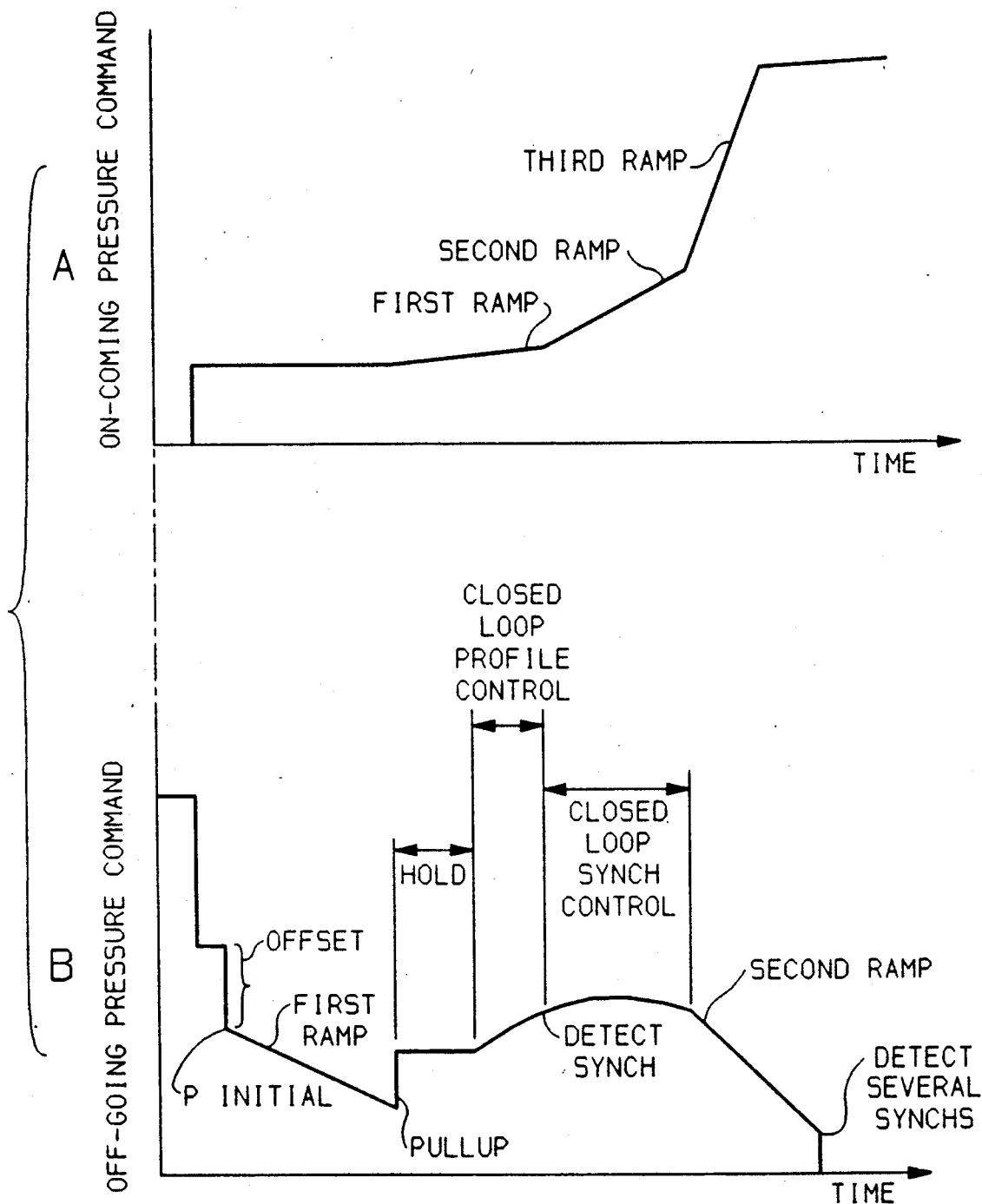
FIG. 4 illustrates the on-coming and off-going pressure commands for clutch-to-clutch shifting according to the invention.

FIG. 4, graphs A and B, respectively, show the on-coming and off-going pressure commands for control of the on-coming and off-going clutches during a powered downshift. At shift initiation, the off-going clutch pressure command is stepped to an offset value for a set time, then stepped to an initial pressure value, and is then ramped downward at a programmed rate until turbine speed pullup occurs. This pullup is a result of the beginning of off-going clutch slip. Pullup is detected by the turbine speed Nt becoming greater than the product of the output speed No and the old or lower speed ratio SR(old) plus a constant K, or algebraically, $$Nt > No * SR(old) + K.$$

During this same time interval, the on-coming pressure command is set at a low "fill" pressure level to prepare for the time when the on-coming clutch must engage.

When the off-going clutch starts to slip, the coefficient of friction in the clutch changes from a static level to a dynamic level. The friction reduction and its associated decrease in clutch torque capacity is compensated for by increasing the clutch pressure in a step fashion to a level at which the torque capacity of the clutch remains nearly constant. This pressure command level is maintained for a preset hold time or until on-coming clutch synchronization (sync) has occurred. Synchronization is detected when the turbine speed equals the output speed times the new or high speed ratio, or Nt = No * SR(new). If the hold time has elapsed before on-coming clutch synchronization, the off-going clutch pressure command is determined by a closed-loop control signal which attempts to maintain on-coming clutch slip on a predefined profile. This closed-loop slip profile control continues until on-coming clutch sync has been detected. Beginning at the detected pullup and continuing through this interval of off-going clutch closed-loop control, the on-coming clutch pressure is ramped upward at a first ramp rate.

Figure 5:
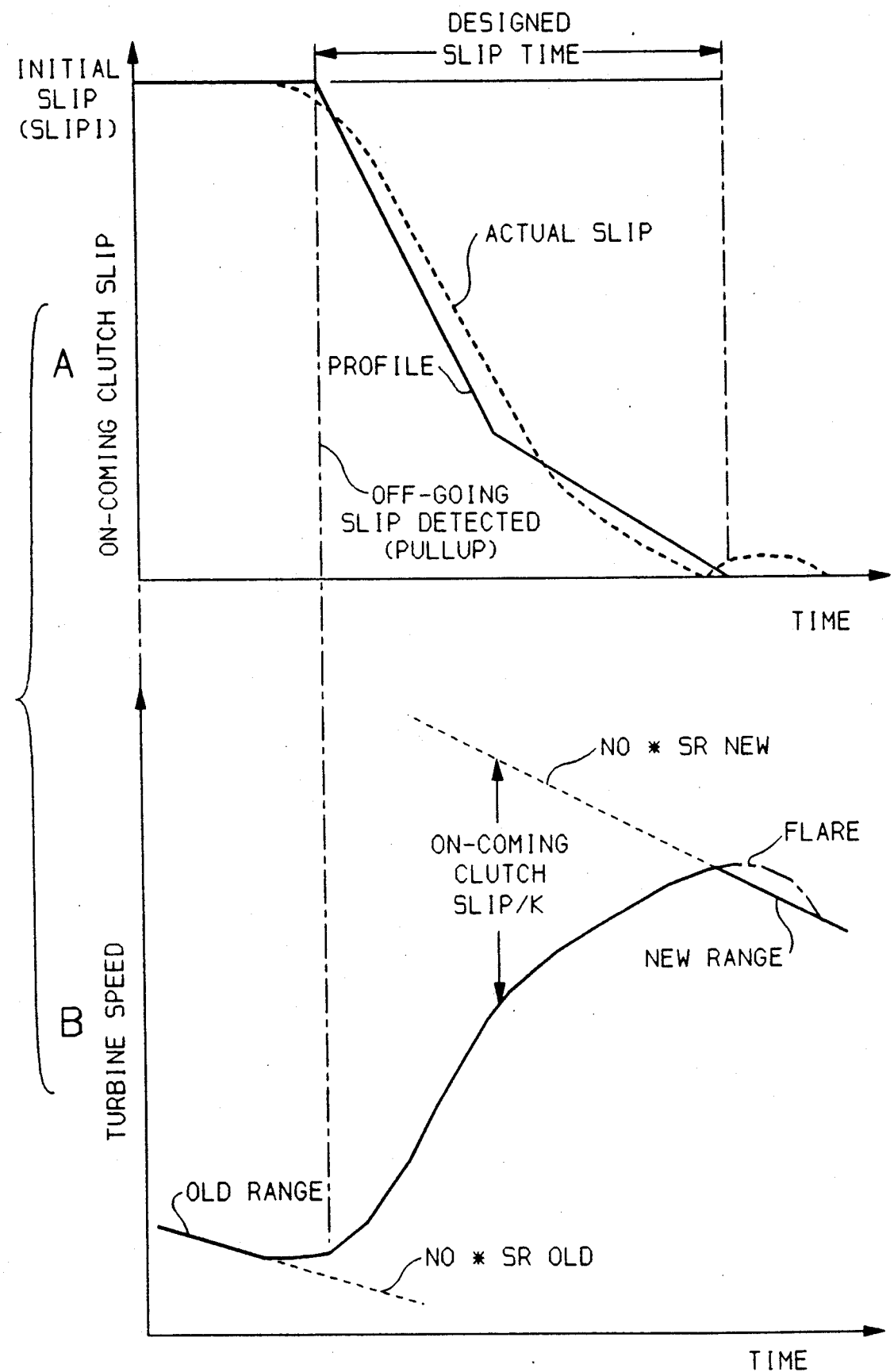
FIG. 5 illustrates the on-coming clutch slip for the closed-loop operation of the off-going clutch, and the turbine speed during the closed-loop period.

The closed-loop profile control is better explained with reference to FIG. 5, graph A, which shows the on-coming clutch slip speed profile in solid lines and actual slip speed in dashed lines. Slip speed is determined by comparing the turbine speed to the output speed. Specifically, slip speed is the absolute value of the difference (times a conversion factor K) between turbine speed and the product of the output speed and the speed ratio of the higher or new range, or algebraically, $$SLIP = ABS \{K*[Nt- (No * SR(new))]\}.$$

Thus, as soon as a shift command is issued, there is slip in the on-coming clutch. The initial slip speed, SLIPI, is the slip value at the initiation of closed-loop. The slip speed profile begins at that point and decreases at a fixed rate, called the first slope. Then at a determined point, the rate reduces to a second slope. The slopes are chosen so that, ideally, the actual slip speed can be made to smoothly go to zero within a given time period. The second slope is less steep than the first slope and reduces end of shift torque disturbance by more closely matching the acceleration rates on both sides of the on-coming clutch. By using slip speed as the control target, both turbine and output speeds are taken into account when controlling the shift duration.

To determine the slopes of the slip profile, three constants C1, C2 and C3 are defined. The constant C1 is a fraction of SLIPI at which the second slope begins; i.e., if SLIP = ≦C1*SLIPI, the slope changes to slope 2. The constant C2 is the desired time to utilize the first slope. The constant C3 is the desired overall closed-loop time. The constants C2 and C3 are used only for the slope calculation and not for direct timing purposes. The first and second slopes SLOPE1, SLOPE2 are defined as:

$$SLOPE1 = [SLIPI-(C1*SLIPI)]/C2; \text{ and } SLOPE2 = C1*SLIPI/(C3-C2).$$

The closed-loop profile control is carried out by correcting the off-going clutch command pressure by a term which is proportional to slip speed error. The effect on turbine speed is shown in FIG. 5, graph B, where pullup is detected when turbine speed increases a certain amount above the lower dashed line which represents the product of output speed and speed ratio for the old range. Thereafter the turbine speed increases in accordance with the profile control where on-coming clutch slip speed is seen to be the difference between the turbine speed curve and the upper dashed line which represents the product of output speed and speed ratio for the new range. Ideally, the slip speed converges to zero but in some conditions the turbine speed exceeds the target value and turbine flare results as shown by broken lines in graphs A and B.

Once the first sync has been detected, a closed-loop sync control is invoked to bring the slip speed to zero by integral-plus-proportional control, thereby to maintain on-coming clutch synchronization. Simultaneously, the ramp rate of the on-coming clutch pressure command is increased to a second ramp rate which is greater than the first. This closed-loop sync control and second ramp rate continues until a preset number of additional syncs are detected. Then to complete the shift, the off-going pressure is ramped toward zero at a second ramp rate, and the on-coming pressure is increased at a third ramp rate which is greater than its second ramp rate. Control can return to the closed-loop sync control from the second off-going ramp phase if turbine flare is detected (indicating on-coming clutch under-fill).

The closed-loop sync control is a proportional plus integral control algorithm using the slip speed as an error signal and correcting the off-going clutch pressure by the sum of proportional and integral terms. The second ramp rate of the on-coming clutch continues throughout this phase. Time constraints are imposed to assure that the shift does not take too long. If a set time after first sync detection expires, or if a set time after off-going clutch slip expires, the shift is completed by ramping both pressures to their final values, as though the preset number of syncs were detected.

There are some cases where the sync control phase is bypassed and shift completion directly follows the profile control phase. Two of these cases are a near-converged converter-lockup shift and a near-converged long open-converter shift. This determination depends on the adaptive control (block 162) which calculates the amount of a shift parameter change required to achieve a high quality shift (or convergence). If only a small correction is needed, the shift is "near converged". If the torque converter is in the open-converter mode and the time between slip and first sync exceeds a preset value, it is considered to be a long converter shift. In these two cases, the off-going pressure is immediately exhausted and the on-coming pressure is ramped up at the third ramp rate. Sync control is also bypassed if the time since pullup exceeds a set value. In that case, however, the off-going clutch is ramped off at the second rate instead of being immediately exhausted.

The control technique described above has several advantages over prior techniques. The low fill command pressure for the on-coming clutch is insufficient to cause torque transfer until late in the second ramp phase. This eliminates the detrimental effect on shift quality resulting from an on-coming clutch overfill at maximum pressure and allows off-going clutch control of the shift. The multiple slopes or ramp rates of the on-coming pressure command provide significant protection from shift miscalibration due to system variation. The first slope begins the clutch fill process but insures that no significant pressure is generated. The second slope completes the fill process and begins the on-coming clutch pull-in process. The third slope completes the clutch application. Fill (or compression) of the on-coming clutch occurs simultaneously with the reduction of on-coming clutch slip which is caused by the increased turbine speed permitted by the slipping off-going clutch. Consequently, the on-coming clutch is ready for application immediately upon the detection of synchronization. This shortens the holding period required for off-going clutch control and significantly reduces the energy dissipation required in the off-going clutch.

Another important feature is the off-going clutch pressure command step which follows the detection of turbine pullup. This compensates for the change from static to dynamic friction and allows the off-going clutch to gain control of the on-coming clutch pullup rate prior to initiation of the closed-loop profile control. The delay in beginning closed-loop control after the pressure command step allows the pressure to fully react to the step command before introducing additional command changes.

The use of the closed-loop on-coming clutch slip speed profile control establishes slip control before synchronization is reached and thereby brings the on-coming clutch elements to the same speed before torque transfer takes place in that clutch. The following sync control, when employed, continues to keep the clutch close to sync as the clutch engaging pressure is applied, thereby minimizing turbine speed flare and associated shift quality degradation. In addition, the slip profile itself helps to provide consistent shift timing.

Additional protection from shift miscalibration is provided by constantly monitoring turbine flare during the second ramp of the off-going clutch. If flare occurs (indicating insufficient on-coming clutch capacity), the sync control phase is re-established. This allows additional time for on-coming clutch fill and prevents additional flare.

A key part of the powered downshift clutch control is the immediate exhaust of the off-going clutch for near-converged converter-lockup and long open-converter shifts. This significantly reduces off-going clutch heat generation due to clutch synchronization control when this task is not required to achieve desired shift quality.

Figure 6:
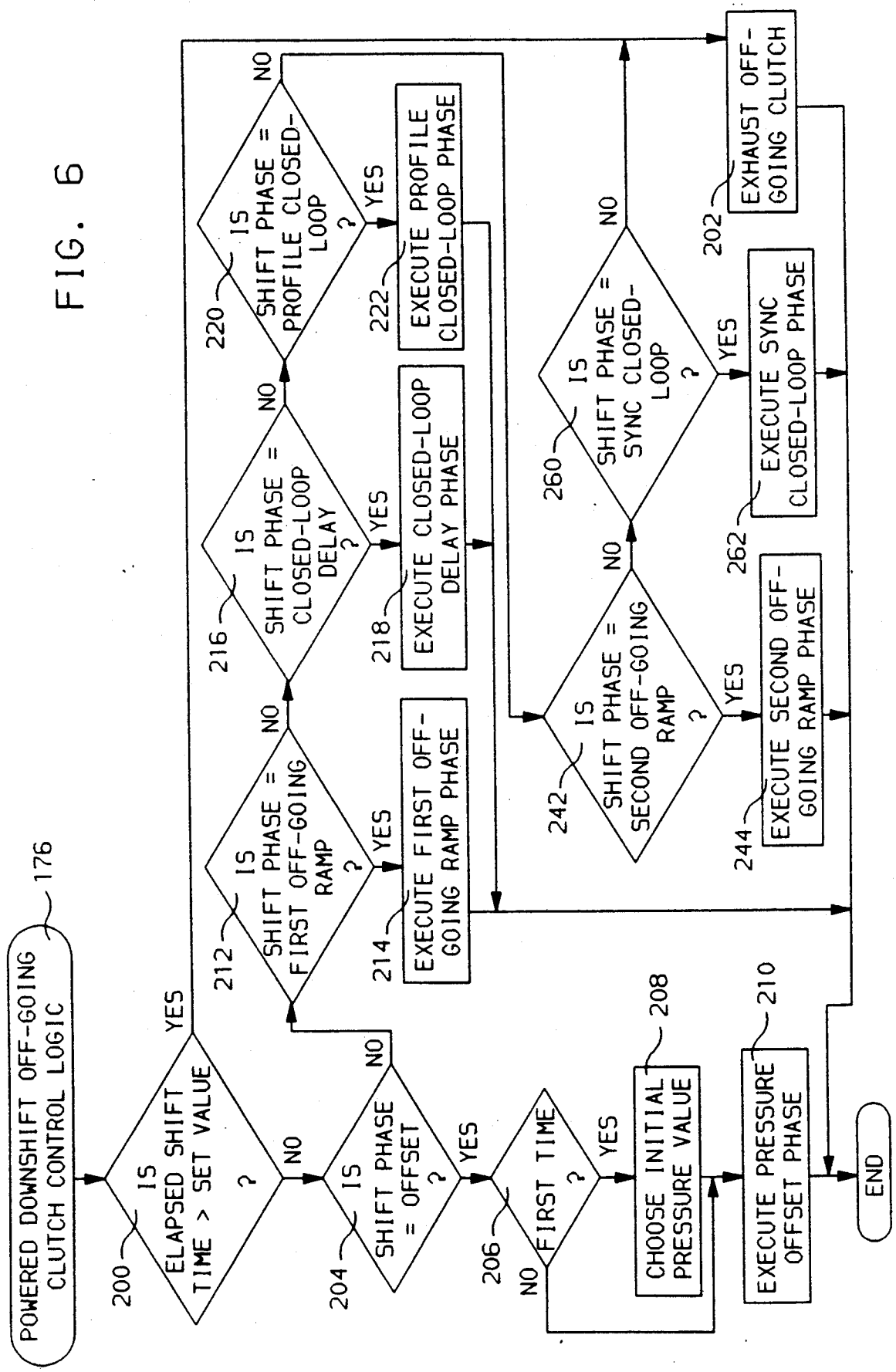
FIGS. 6 through 9 are flow diagrams illustrating the powered downshift logic for the off-going clutch, according to the invention.

The flow charts of FIGS. 6–10 illustrate the control logic incorporated in the program for powered downshift control. FIG. 6 shows the logic flow for the off-going clutch control <176>. First, the shift time is tested <200> and if it has expired, the off-going clutch is exhausted <202> to end the shift. If the time has not elapsed, SHIFT PHASE is examined. SHIFT PHASE is a pointer indicating the stage of shift progress. If the SHIFT PHASE is OFFSET <204>, and the loop is run for the first time <206>, an initial pressure value, Pinitial, is set <208>. If not, block 208 is bypassed. Next, the pressure offset phase is executed <210>. In the offset phase, if the time since shift initiation does not exceed a set value, the off-going pressure command is set equal to the chosen initial pressure plus an offset amount, Pinitial +Offset. If the time does exceed that value, the off-going pressure command is set to the chosen initial pressure and SHIFT PHASE is set to FIRST OFF-GOING RAMP.

If SHIFT PHASE is FIRST OFF-GOING RAMP <212>, the FIRST OFF-GOING RAMP routine is executed <214>. In that routine, the off-going pressure command is decremented by a preset value. If turbine pullup is then detected, the off-going pressure command is increased by a step amount and SHIFT PHASE is set to CLOSED-LOOP DELAY.

If SHIFT PHASE is CLOSED-LOOP DELAY <216>, the CLOSED-LOOP DELAY routine is executed <218>. There, the off-going pressure command is held at its last value. The closed-loop slip speed profile is computed, and, when either a given time has elapsed or one sync (or oversync) is detected, SHIFT PHASE is set to PROFILE CLOSED-LOOP.

Figure 7:
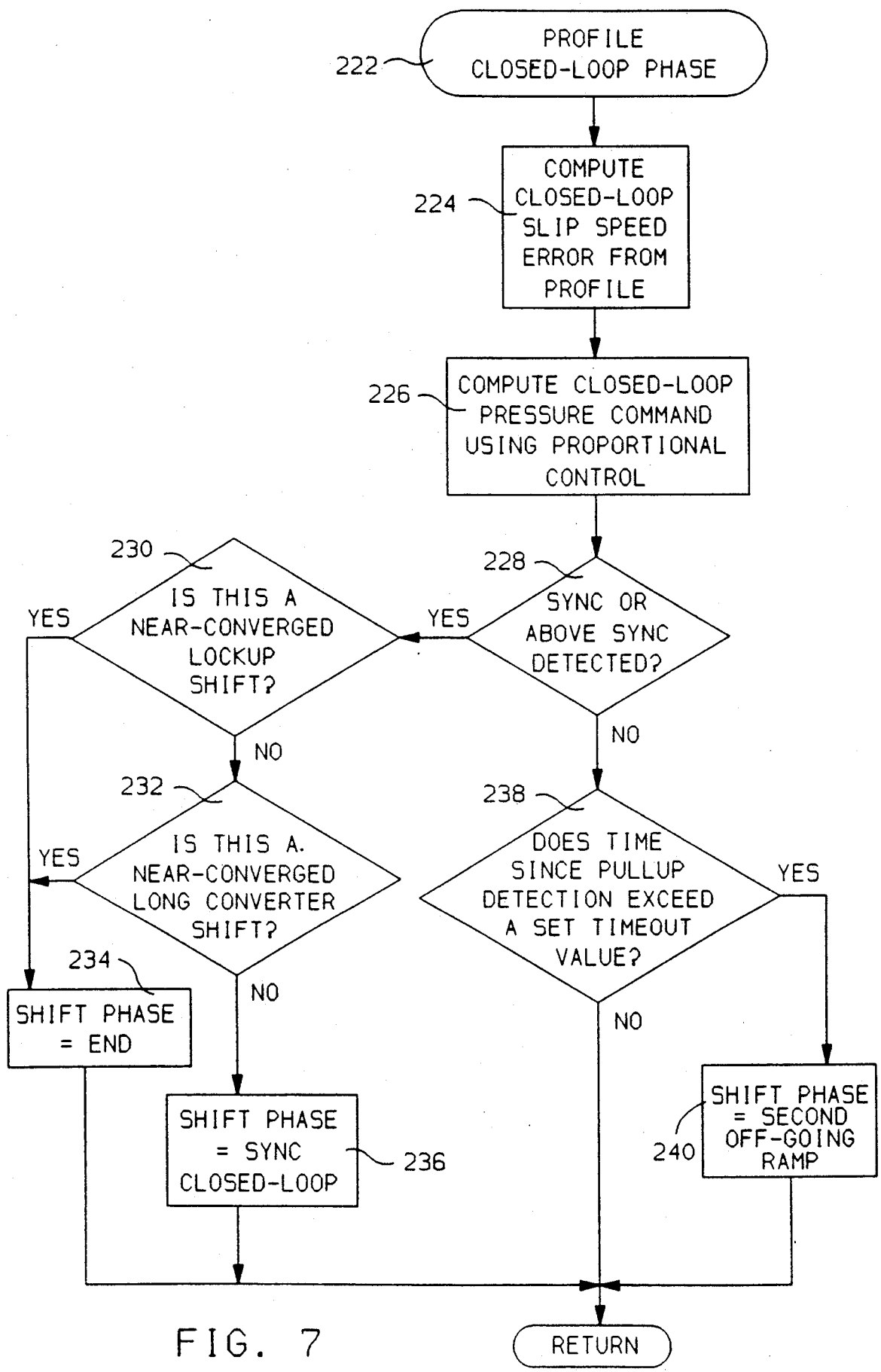

If SHIFT PHASE equals PROFILE CLOSED-LOOP <220>, the PROFILE CLOSED-LOOP routine is executed <222> as shown in FIG. 7. The slip speed error is calculated from the profile (FIG. 5) <224> and closed-loop pressure command is computed using proportional control <226>. If sync or a value above sync is detected <228>, and if the shift is a near-converged lockup shift <230> or a near-converged long converter shift <232>, SHIFT PHASE is set to END <234>. Otherwise, SHIFT PHASE is set to SYNC CLOSED-LOOP <236>. If sync (or oversync) is not detected <228>, and the time since pullup detection exceeds a set TIMEOUT value <238>, SHIFT PHASE is set to SECOND OFF-GOING RAMP <240>.

Figure 8:
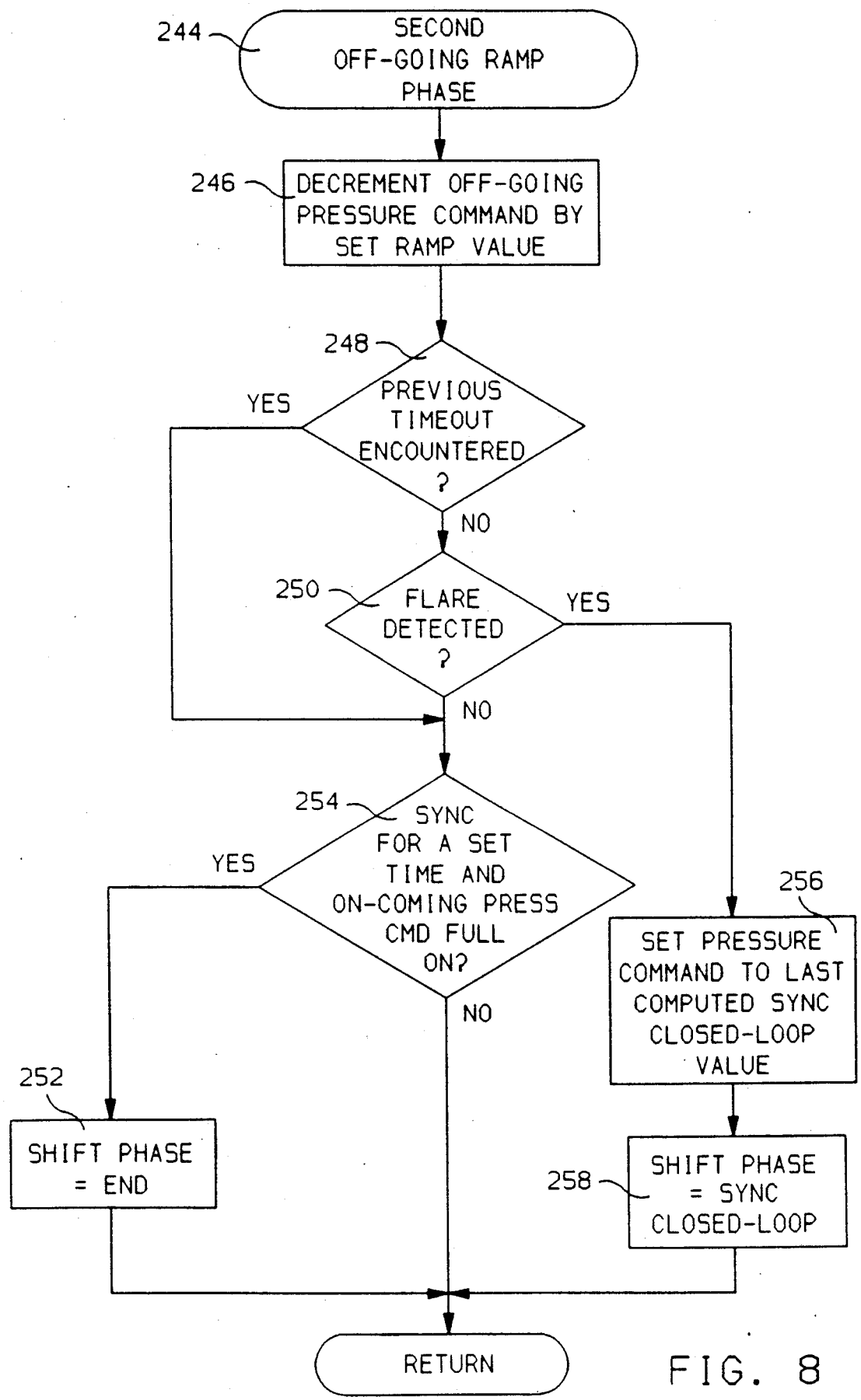

If SHIFT PHASE is SECOND OFF-GOING RAMP <242>, the SECOND OFF-GOING RAMP routine is executed <244>, as shown in FIG. 8. The off-going pressure command is decremented by a set amount <246> each time through the loop. If a previous TIMEOUT has been encountered <248>, or if no flare is detected <250>, SHIFT PHASE is set to END provided sync has been detected for a certain time and the on-coming pressure command is full on <254>. If turbine flare is detected <250>, the off-going pressure command is set to the last computed sync closed-loop value <256> and SHIFT PHASE is set to SYNC CLOSED-LOOP <258>.

Figure 9:
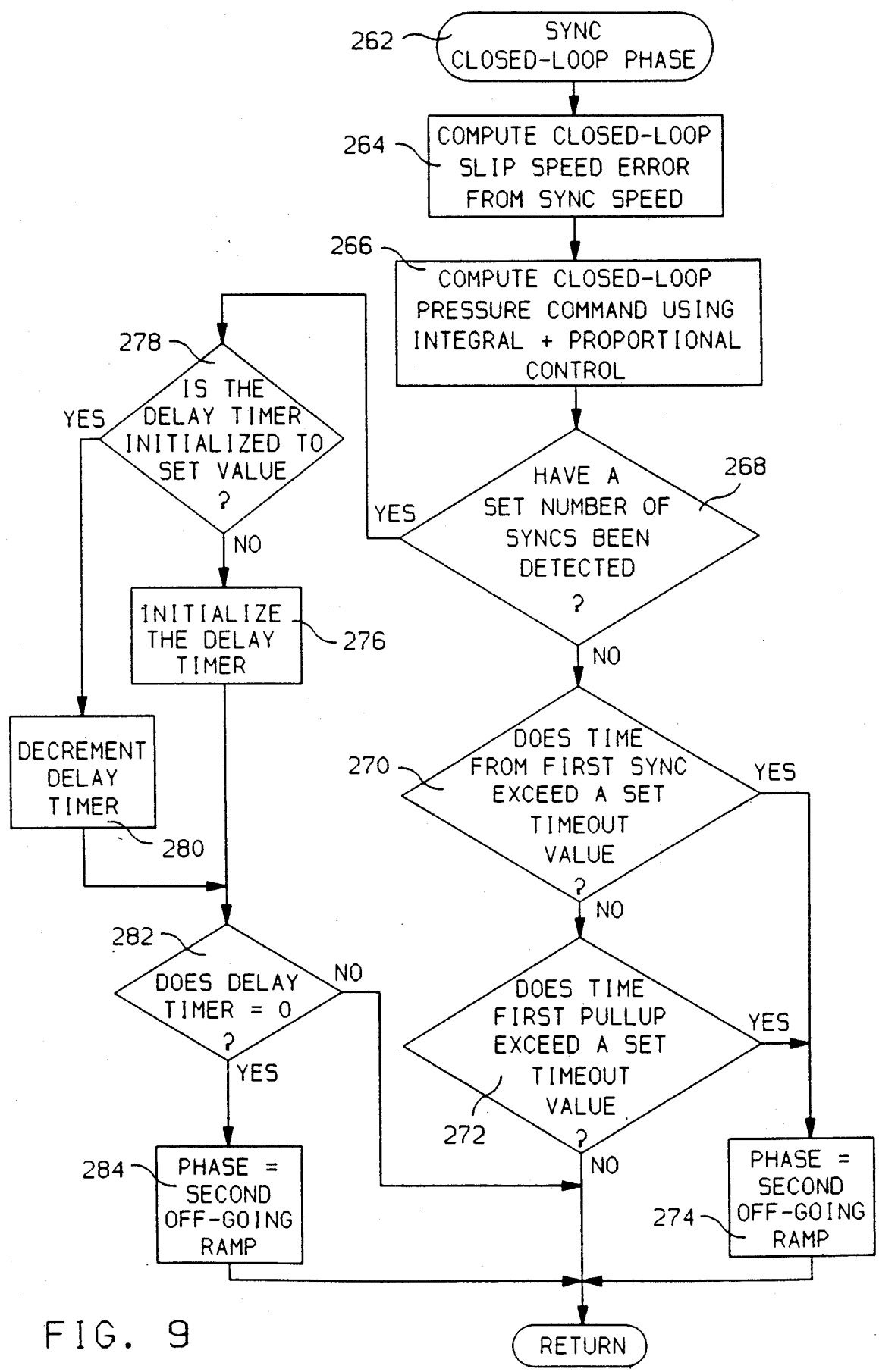

If SHIFT PHASE is SYNC CLOSED-LOOP <260>, the SYNC CLOSED-LOOP routine is executed <262> as shown in FIG. 9. The closed-loop slip speed error is computed from sync speed <264> and the pressure command is computed using integral/proportional control <266>. If a certain number of sync signals (not necessarily consecutive) have not been detected <268>, it is determined whether a time from first sync <270> or a time from pullup <272> have timed out. If not timed out, the routine repeats but if either has timed out, SHIFT PHASE is set to SECOND OFF-GOING RAMP <274>. If the required number of syncs have been detected <268>, a delay timer is initialized <276>, or if already initialized <278>, it is decremented <280>. Then if the delay timer times out <282>, SHIFT PHASE is set to SECOND OFF-GOING RAMP <284> and if not timed out the loop repeats.

Figure 10:
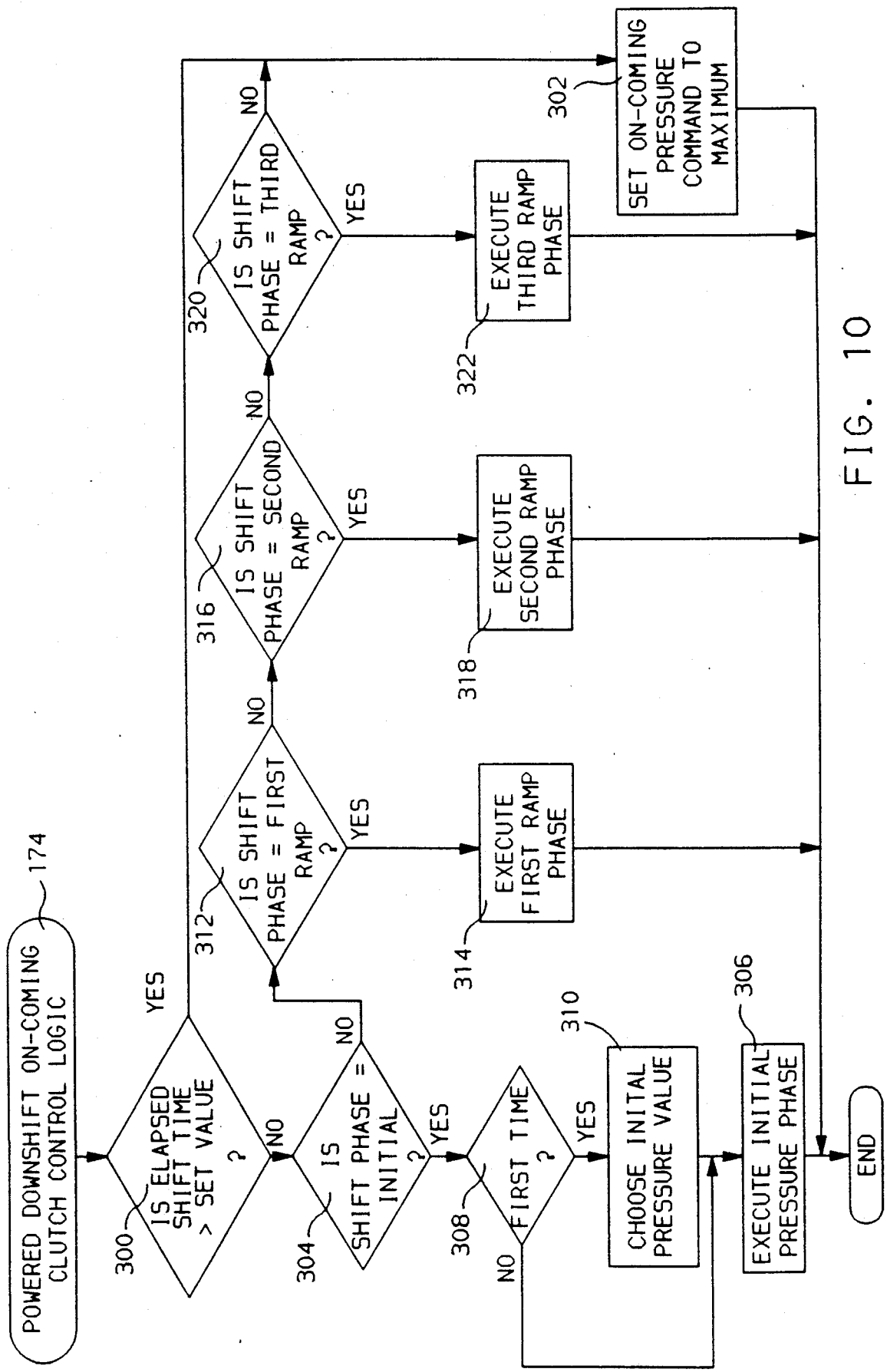
FIG. 10 a flow diagram illustrating the powered downshift logic for the on-coming clutch, according to the invention.

The powered downshift on-coming clutch control logic program 174 is shown in FIG. 10. If the shift time exceeds a preset limit value <300>, the on-coming pressure command is set to its maximum value <302> to assure immediate completion of the shift.

If the SHIFT PHASE is equal to INITIAL PRESSURE <304>, the INITIAL PRESSURE routine is executed <306>. If it is the first time through the routine <308>, initial pressure and other parameters are chosen based on throttle value and shift type <310>. In this and the subsequent routines, tables of calibrated values may be prepared for various throttle and transmission conditions so that the optimum pressure, pressure increment or time can be selected. The initial pressure routine sets the pressure command to an initial pressure value. The pressure command does not change as the loop repeats unless pullup is detected or the off-going pressure command equals zero. In those events, SHIFT PHASE is set to FIRST RAMP and first ramp increment is chosen based on transmission mode (lockup or converter).

If the SHIFT PHASE equals FIRST RAMP <312>, the FIRST RAMP routine is executed <314>. There the on-coming pressure command is incremented by the chosen increment value each time through the loop. If on-coming clutch sync or an above sync condition is detected, SHIFT PHASE is set to SECOND RAMP and the pressure increment is chosen for the second ramp.

If the SHIFT PHASE equals SECOND RAMP <316>, the SECOND RAMP routine is executed <318>. There the pressure command is incremented by the chosen value each time through the loop. If (1) a given number of syncs are detected, (2) the time from pullup exceeds a set value, or (3) the time from sync exceeds another set value, SHIFT PHASE is set to THIRD RAMP and the third ramp pressure increment is chosen.

If the SHIFT PHASE equals THIRD RAMP <320>, the THIRD RAMP routine is executed <322>. In that routine the on-coming pressure command is incremented by the chosen value. If the maximum on-coming pressure is commanded and sync has been detected for a given time the shift is completed.

While this invention has been described in reference to the illustrated embodiments, various modifications will occur to those skilled in the art, and controls incorporating such modifications may fall within the scope of this invention which is defined by the appended claims.

Claims:

1. In a vehicular automatic transmission having an input and an output, a turbine connected to the input to couple driving torque thereto, in which a powered downshift from a first transmission speed ratio to a second transmission speed ratio is carried out through concurrent disengagement of an off-going fluid pressure operated torque transmitting device associated with the first of such speed ratios and engagement of an on-coming fluid pressure operated torque transmitting device associated with the second of such speed ratios, and further having turbine and output speed sensing means, a method of controlling the torque transmitting devices to effect a powered downshift comprising the steps of:
   commanding a pressure on the on-coming torque transmitting device for filling the device and insufficient to effect torque transfer,
   commanding a progressively decreasing pressure on the off-going torque transmitting device to permit slip thereof an sensing such slip by detecting turbine speed pullup, and after such detection,
   commanding a supplied pressure to the off-going torque transmitting device to increase by a set value,
   initiating a closed-loop control period during which the on-coming pressure is gradually increased, a slip speed profile is established, the slip of the on-coming torque transmitting device is measured, and the pressure of the off-going torque transmitting device is controlled to control the slip of the on-coming torque transmitting device in accord with the profile, and
   determining synchronization of the on coming torque transmitting device from a comparison of the turbine speed and the output speed and, when a synchronization value is detected, increasing the commanded on-coming pressure to a maximum value and decreasing the commanded off-going pressure to complete the shift.

2. The invention as defined in claim 1 wherein the step of commanding the supplied pressure to the off-going torque transmitting device to increase by a set value comprises commanding a step increase to a new value sufficient to compensate for the decrease of the coefficient of friction in the off-going torque transmitting device at the commencement of slip.

3. The invention as defined in claim 2 wherein the step of commanding a step increase to a new value is followed by a step of holding the new value for a time to allow the off-going torque transmitting device to fully respond to the step increase before initiating closed-loop control.

4. The invention as defined in claim 1 wherein the step of increasing the commanded on-coming pressure to a maximum value comprises, the steps of:
   initiating a closed-loop synchronization control period by sensing synchronization error in the on-coming torque transmitting device and controlling the off-going torque transmitting device pressure by a proportional plus integral control to minimize the error,
   increasing the on-coming pressure at a ramp rate, sufficient to begin torque transmission during the synchronization control period, and
   when stable synchronization of the on-coming torque transmitting device occurs, ramping the on-coming pressure up at a rate to quickly achieve a maximum value and ramping the off-going pressure to zero.

5. The invention as defined in claim 4 wherein the step of initiating the closed-loop synchronization control period is conditional upon the transmission operating conditions and includes the step of:
   detecting turbine speed flare wherein the turbine speed is greater than that required for synchronization.

6. The invention as defined in claim 4 wherein synchronization is determined when the turbine speed is substantially equal to the product of the output speed and the second speed ratio.

7. The invention as defined in claim 4 including the steps of monitoring turbine flare during the step of ramping the off-going pressure to zero, and if flare is detected, returning, to the step of initiating a closed-loop synchronization control period.

8. The invention as defined in claim 1 including the step effective in a converter-lockup shift and in a long open-converter shift of immediately drawing the off-going torque transmitting device during the closed-loop control period when synchronization of the on-coming torque transmitting device is detected.

* * * * *